United States Patent [19]

Mentrup et al.

[11] 3,846,549

[45] Nov. 5, 1974

[54] PHARMACEUTICAL COMPOSITIONS CONTAINING AN N-(1-BICYCLIC ARYL-PROPYL -2)-N-PHENYL-PIPERAZINE

[75] Inventors: Anton Mentrup; Karl Zeile; Peter Danneberg; Kurt Schromm, all of Ingelheim/Rhine; Jeanette Guenard, Mainz; Ernst-Otto Renth; Harry Stotzer, both of Ingelheim/Rhine, all of Germany

[73] Assignee: Boehringer Ingelheim GmbH, Ingelheim am Rhine, Germany

[22] Filed: July 5, 1973

[21] Appl. No.: 376,910

Related U.S. Application Data

[60] Continuation-in-part of Ser. No. 312,339, Dec. 5, 1972, abandoned, which is a division of Ser. No. 110,766, Jan. 8, 1971, Pat. No. 3,729,474, which is a continuation of Ser. No. 663,973, Aug. 29, 1967, abandoned, and a continuation-in-part of Ser. No. 274,903, July 25, 1972, abandoned.

[30] Foreign Application Priority Data

Aug. 1, 1967 Germany.............................. 93758
Sept. 3, 1966 Germany.............................. 88772
July 23, 1971 Germany........................... 2136929

[52] U.S. Cl. ................................................ 424/250
[51] Int. Cl............................................ A61k 27/00
[58] Field of Search................................... 424/250

[56] References Cited
UNITED STATES PATENTS
3,119,826   1/1964   Regnier.............................. 260/268

*Primary Examiner*—Stanley J. Friedman
*Attorney, Agent, or Firm*—Hammond & Littell

[57] ABSTRACT

Pharmaceutical compositions containing as an active ingredient a racemic or optically active compound of the formula

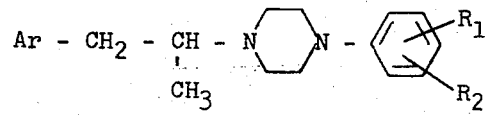

wherein Ar is 3,4-methylenedioxy-phenyl, indanyl, naphthyl or 1,4-benzodioxanyl, and
$R_1$ and $R_2$ are each hydrogen, halogen, amino, acetyl-amino, trifluoromethyl, alkyl of 1 to 4 carbon atoms, alkoxy of 1 to 4 carbon atoms, alkyl-carbonyl of 1 to 4 carbon atoms or alkylthio of 1 to 4 carbon atoms,
or a non-toxic, pharmacologically acceptable acid addition salt thereof; and methods of using them as central nervous system depressants and antihypercholesteremics.

18 Claims, No Drawings

PHARMACEUTICAL COMPOSITIONS CONTAINING AN N-(1-BICYCLIC ARYL-PROPYL-2)-N-PHENYL-PIPERAZINE

This is a continuation-in-part of copending application Ser. No. 312,339, filed Dec. 5, 1972, now abandoned which in turn is a division of copending application Ser. No. 110,766, filed Jan. 28, 1971, now U.S. Pat. No. 3,729,474 issued Apr. 24, 1973; which in turn is a continuation of application Ser. No. 663,973, filed Aug. 29, 1967, now abandoned; and a continuation-in-part of copending application Ser. No. 274,903, filed July 25, 1972, now abandoned.

This invention relates to novel pharmaceutical compositions containing as an active ingredient an N-(1-bicyclic aryl-propyl-2)-N'-phenyl-piperazine or a non-toxic acid addition salt thereof, as well as to methods of depressing the central nervous system and lowering the blood cholesterol level in warm-blooded animals therewith.

More particularly the present invention relates to pharmaceutical compositions containing as an active ingredient a racemic or optically active compound of the formula $$Ar - CH_2 - \underset{CH_3}{CH} - N\diagup\diagdown N - \text{(phenyl)}\begin{array}{c}R_1\\R_2\end{array} \quad (I)$$

wherein Ar is 3,4-methylenedioxy-phenyl, indanyl, naphthyl or 1,4-benzodioxanyl, and $R_1$ and $R_2$ are each hydrogen, halogen, amino, acetylamino, trifluoromethyl, alkyl of 1 to 4 carbon atoms, alkoxy of 1 to 4 carbon atoms, alkyl-carbonyl of 1 to 4 carbon atoms or alkylthio of 1 to 4 carbon atoms, or a non-toxic, pharmacologically acceptable acid addition salt thereof.

The compounds of the formula I may be prepared by a number of different methods involving well known chemical principles, among which the following have proved to be particularly convenient and efficient:

Method A

By introducing a 1-aryl-propyl-(2) radical, where the aryl moiety corresponds in structure to the Ar-substituent in formula I, into the N'-position of an N-phenyl-piperazine of the formula $$H - N\diagup\diagdown N - \text{(phenyl)}\begin{array}{c}R_1\\R_2\end{array} \quad (II)$$

wherein $R_1$ and $R_2$ have the same meanings as in formula I, pursuant to customary methods, preferably by reacting a compound of the formula II with an electrophilic 1-aryl-propyl-(2) compound, such as a 1-arylpropyl(2)-chloride or -bromide or an alkylsulfonic or arylsulfonic acid ester of a 1-aryl-propanol-(2), in the presence of an acid-binding agent; or by reacting a compound of the formula II with a 1-aryl-propanone-(2) in the presence of catalytically activated hydrogen.

Method B

By hydrogenating an N-(1-bicyclic aryl-1-halopropyl-2)-N'-phenyl-piperazine of the formula $$Ar - \underset{}{CH} - \underset{CH_3}{CH} - N\diagup\diagdown N - \text{(phenyl)}\begin{array}{c}R_1\\R_2\end{array} \quad (III)$$
$$\overset{Hal}{|}$$

wherein $R_1$, $R_2$ and Ar have the same meanings as in formula I, and Hal is chlorine, bromine or iodine, preferably chlorine, with catalytically activated hydrogen.

Method C

By reacting a compound of the formula $$Q - N(CH_2 - CH_2 - X)_2 \quad (IV)$$

wherein Q is $Ar - CH_2 - CH(CH_3)-$ or $-\text{(phenyl)}\begin{array}{c}R_1\\R_2\end{array}$, where Ar, $R_1$ and $R_2$ have the same meanings as in formula I, and X is a substituent which may easily anionically be removed, such as halogen, alkylsulfonyloxy or arylsulfonyloxy, with a primary amine of the formula $$Q_1 - NH_2 \quad (V)$$

wherein $Q_1$ has the same meanings as Q, but must be different from Q.

Method D

By alkylating an N,N-disubstituted ethylene-diamine of the formula $$Ar-CH_2-\underset{CH_3}{CH}-NH-CH_2-CH_2-NH - \text{(phenyl)}\begin{array}{c}R_1\\R_2\end{array} \quad (VI)$$

wherein Ar, $R_1$ and $R_2$ have the same meanings as in formula I, with a di-substituted ethane of the formula $$X - CH_2 - CH_2 - X \quad (VII)$$

wherein X has the same meanings as in formula IV, preferably with a dihaloethane, especially dibromoethane.

Methods B through D above are advantageously performed at elevated temperatures and in the presence of an acid-binding agent.

Method E

By reducing a compound of the formula $$Ar-CH_2-\underset{CH_3}{CH} - N\overset{A}{\diagup\diagdown}_{CH_2-CH_2} N - \text{(phenyl)}\begin{array}{c}R_1\\R_2\end{array} \quad (VIII)$$

wherein Ar, $R_1$ and $R_2$ have the same meanings as in formula I and A is $-CO-CH_2-$ or $-CH_2-CO-$, with a complex metal hydride, such as lithium aluminum hydride, provided that, other than A, compound VIII contains no other groupings which are reduceable by means of the particular complex metal hydride which is employed.

Method F

By converting a compound of the formula

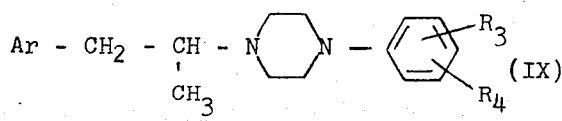

wherein Ar has the same meanings as in formula I, and $R_3$ and/or $R_4$ are substituents which may readily be converted into substituents $R_1$ and $R_2$ in formula I by customary methods, into the corresponding compound of the formula I in known fashion. One of $R_3$ and $R_4$ may also have the meanings of $R_1$ and $R_2$ in formula I.

Thus, for example, a compound of the formula IX wherein $R_3$ and/or $R_4$ are nitro may be converted by catalytic reduction into the corresponding compound of the formula I wherein $R_1$ and/or $R_2$ are amino which, in turn, may be converted into the corresponding compound of the formula I wherein $R_1$ and/or $R_2$ are halogen or cyano by diazotisation and heating with a cuprous halide or cuprous cyanide. Alternatively, a compound of the formula I wherein $R_1$ and/or $R_2$ are amino may be converted into the corresponding compound wherein $R_1$ and/or $R_2$ are acylamino by acylating the former with an acid halide or acid anhydride, such as acetyl chloride or acetic anhydride.

Finally, a compound of the formula I wherein $R_1$ and/or $R_2$ are alkoxy of 1 to 4 carbom atoms may be obtained by reacting a corresponding compound of the formula IX wherein $R_3$ and/or $R_4$ are hydroxy with an alkylating agent, such as an alkyl halide, dialkylsulfate or diazoalkane.

Method G

For the preparation of a compound of the formula I wherein Ar is 1,4-benzodioxanyl or 3,4-methylenedioxyphenyl by reacting a compound of the formula

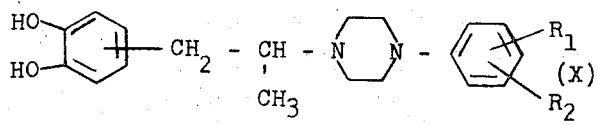

wherein $R_1$ and $R_2$ have the same meanings as in formula I, with a compound of the formula $$X — (CH_2)_n — X$$

(XI)

wherein X has the same meanings as in formula IV, preferably halogen, and n is an integer from 1 to 2, inclusive, advantageously in the presence of an acid-binding agent and at moderately elevated temperatures.

The majority of the starting compounds required for methods A through G are known compounds, and those which have heretofore not been specifically described in the literature may readily be prepared by customary methods described in current chemical handbooks, such as Houben-Weyl, 1st and 2nd Editions.

Thus, for example, a compound of the formula II may be prepared by the processes described in J.A.C.S. 76, 1853 (1954) and J. Med. Chem. 8, 332 (1965). An electrophilic 1-arylpropyl-(2) compound may be obtained by esterification of the corresponding 1aryl-propanol-(2), as illustrated in Example 1 below, and a 1-arylpropanone-(2) may be obtained by the process described in Org. Synth. Coll., Vol. IV, page 573.

A compound of the formula III may be prepared by reducing a corresponding N-[1-aryl-1-oxo-propyl-(2)]-N'-(substituted phenyl)-piperazine (obtained by reacting a 1-aryl-2-bromo-propanone-(1) with an N-(substituted phenyl)-piperazine) according to the process described in Japanese Pat. No. 23,412/64, and haloganating the intermediate N-[1-aryl-1-hydroxy-propyl-(2)]-N'-(substituted phenyl)-piperazine obtained thereby pursuant to customary methods, such as with $SOCl_2$ as described in German Auslegesschrift No. 1,212,973, or with $PCl_5$ as described in J. Chem. Soc. (London) 1963, page 1385, and illustrated in Example 4 below.

Starting compounds of the formula IV, V and VI may be obtained by the methods described in German Auslegeschrift No. 1,212,973, while compounds of the formulas VII and XI may be prepared by esterification of the corresponding glycols, or by addition of halogen to the corresponding alkanes, or by replacement of hydrogen by halogen in the corresponding alkanes.

A starting compound of the formula VIII may, for example, be obtained by the process described in J. Med. Chem. 7, 154–158 (1964).

Finally, a starting compound of the formula IX may be prepared by method A above, except that phenyl substituents $R_1$ and $R_2$ in compound II should be the desired substituents $R_3$ and $R_4$, as defined in connection with formula IX.

The compounds of the formula I comprise an asymmetric carbon atom in the $-CH(CH_3)-$ grouping and consequently exist in the form of racemic mixtures as well as optically active antipodes. Racemic mixtures are obtained by starting from racemic mixtures of the starting compounds containing the $-CH(CH_3)-$ grouping. The optically active antipodes may be obtained either by starting with the corresponding optically active starting compound containing the asymmetric carbon grouping, or by converting the racemic mixture of the end product into its diastereomic salt with the aid of optically active auxiliary acids, such as dibenzoyl-D-tartaric acid or bromocamphor-sulfonic acid, and separating the optical antipodes by fractional precipitation or fractional crystallization of the diastereomeric salt.

The compounds embraced by formula I above are organic bases and therefore form acid addition salts with inorganic and organic acids. Such acid addition salts may be obtained in customary fashion, that is, by dissolving the free base in a suitable solvent and acidifying the solution with the desired inorganic or organic acid. Examples of non-toxic, pharmacologically acceptable acid addition salts are those formed with hydrochloric acid, hydrobromic acid, sulfuric acid, methanesulfonic acid, succinic acid, tartaric acid, 8-chlorotheophylline or the like.

The following examples illustrate the preparation of compounds of the formula I and non-toxic acid addition salts thereof.

EXAMPLE 1

N-[1-(3',4'-methylenedioxy-phenyl)-propyl-(2)]-N'-(o-ethyl-phenyl)-piperazine by method A a 1-(3',4'-methylenedioxy-phenyl)-propyl-(2)-p-toluene-sulfonate 107 gm of 1-(3',4'-methylenedioxy-phenyl)-propanone-(2) were reduced in ethanol with 14.2 gm of sodium borohydride, yielding 1-(3',4'-methylenedioxy-phenyl)-propanol-(2), b. p. 153°–156°C. at 14 mm Hg, which was reacted with p-toluenesulfochloride in pyridine to yield 1-(3',4'-methylenedioxy-phenyl)-propyl-(2)-p-toluenesulfonate, m.p. 58°C.

b N-[1-(3',4'-methylenedioxy-phenyl)-propyl-(2)]-N'-(o-ethyl-phenyl)-piperazine

A mixture of 70 gm (0.21 mol) of 1-(3',4'-methylenedioxy-phenyl)-propyl-(2)-p-toluenesulfonate, 80 gm (0.42 mol) of N-(o-ethyl-phenyl)-piperazine and 350 cc of anisole was refluxed for four hours. Thereafter, the anisole was distilled off, and the residue was admixed with 700 cc of water. The crystalline precipitate formed thereby was collected by vacuum filtration, admixed with ammonia, the alkaline mixture was extracted with ether, and the ether was evaporated from the extract solution, yielding the free base N-[1-(3',4'-methylenedioxy-phenyl)-propyl-(2)-N'-(o-ethyl-phenyl)-piperazine. The free base was dissolved in acetonitrile, the solution was acidified with aqueous hydrochloric acid, and the precipitate was collected and recrystallized from methanol, yielding the monohydrochloride of the free base, m. p. 277°C., of the formula

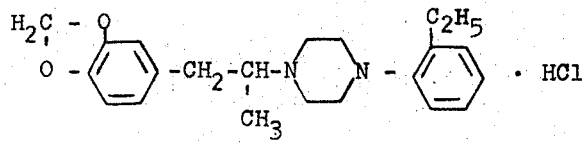

EXAMPLE 2

N-[1(3',4'-methylenedioxy-phenyl)-propyl-(2)]-N'-(o,o'-dimethyl-phenyl)-piperazine and its hydrochloride by method A 33.8 gm (0.1 mol) of 1-(3',4'-methylenedioxyphenyl)-propanol-(2-p-toluenesulfonate, m. p. 58°C, were admixed with 170 cc of anisole and 0.2 mol of N-(o,o'-di-methyl-phenyl)-piperazine, and the mixture was refluxed for four hours. Thereafter, the anisole was distilled off, the residue was admixed with about 300 cc of water, the aqueous solution was acidified with hydrochloric acid, and then ether was added. The precipitate formed thereby was collected by vacuum filtration, admixed with ammonia, the alkaline mixture was extracted with ether, and the ether was evaporated from the extract solution, yielding the free base N-[1-(3',4'-methylenedioxy-phenyl)-propyl-(2)]-N'-(o,o'-di-methylphenyl)-piperazine. The free base was dissolved in ethanol, the solution was acidified with aqueous hydrochloric acid, and the precipitate formed thereby was collected and recrystallized from methanol, yielding the hydrochloride of the free base, m. p. 240°–250°C., of the formula

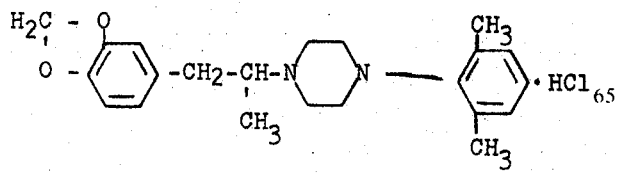

EXAMPLE 3

Using a procedure analogous to that described in Example 1, N-[1-(3',4'-methylenedioxy-phenyl)-propyl-(2)]-N'-(o-methoxy-phenyl)-piperazine, m. p. 98°C. (recrystallized from isopropanol), of the formula

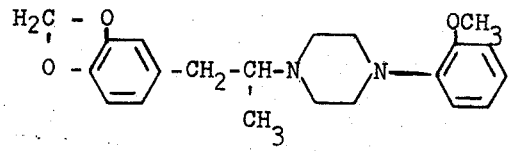

was prepared from 1-(3',4'-methylenedioxy-phenyl)-propanol-(2)-p-toluenesulfonate and N-(o-methoxy-phenyl)-piperazine. Its monohydrochloride had a melting point of 247°C.

EXAMPLE 4

N-[1-(5'-Indanyl)-propyl-(2)]-N'-(o-ethyl-phenyl)-piperazine hydrochloride by method B a. N-[1-(5'-Indanyl)-1-chloro-propyl-(2)]-N'-(o-ethyl-phenyl)-piperazine dihydrochloride 76 gm (0.3 mol) of 1-(5-indanyl)-2-bromo-propanone-(1) were admixed with 1140 cc of benzene and 114 gm of N-(o-ethyl-phenyl)-piperazine, and the mixture was refluxed for several hours. The free base, N-[1-(5'-indanyl)-1-oxopropyl-(2)]-N'-(o-ethyl-phenyl)-piperazine, m. p. 114°C., formed thereby was isolated from the reaction mixture. 79 gm of this free base were reduced with 3.7 gm of sodium borohydride in ethanol, yielding N-[1-(5'-indanyl)-1-hydroxypropyl-(2)]-N'-(o-ethyl-phenyl)-piperazine, which was isolated in the form of its monohydrochloride, m. p. 257°C., and converted into the free base. 20 gm of the free base thus obtained were chlorinated with 24 gm of phosphorus pentachloride in 200 cc of acetonitrile, yielding the dihydrochloride of N-[1-(5'-indanyl)-1-chloro-propyl-(2)]-N'-(o-ethyl-phenyl)-piperazine, m. p. 190°C.

b. N-[1-(5'-indanyl)-propyl-(2)]-N'-(o-ethyl-phenyl)-piperazine hydrochloride 4.55 gm of the dihydrochloride end product obtained in (a) above were dissolved in 45 cc of methanol, 3.62 gm of dimethylaniline and a small amount of Raney nickel were added to the solution, and the mixture was hydrogenated at atmospheric pressure. After working up the reaction mixture in conventional manner, a good yield of N-[1-(5'-indanyl)-propyl-(2)]-N'-(o-ethyl-phenyl)-piperazine hydrochloride, m. p. 276 – 278°C., of the formula

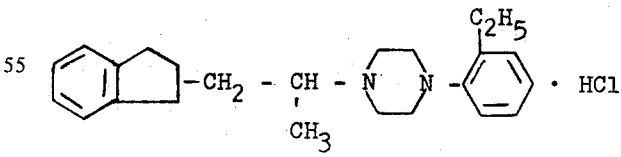

was obtained.

EXAMPLE 5

N-[1-(β-Naphthyl)-propyl-(2)]-N'-(o-ethyl-phenyl)-piperazine hydrochloride by method B a. N-[1-(β-Naphthyl)-1-chloro-propyl-(2)]-N'-(o-ethyl-phenyl)-piperazine monohydrochloride 51 gm of 1-(β-naphthyl)-2-bromo-propanone-(1) were admixed with 500 cc of acetonitrile and 73.7 gm of N-(o-ethyl-phenyl)-piperazine, and the mixture was refluxed for several hours. The reaction mixture was worked up in customary fashion, yielding N-[1-(β-naphthyl)-1-oxo-propyl(2)]-N'-(o-ethyl-phenyl)-piperazine, m. p. 115°–117°C., which was subsequently reduced with sodium borohydride in ethanol, yielding N-[1-(β-naphthyl)-1-hydroxy-propyl-(2)]-N'-(o-ethyl-phenyl)-piperazine, whose monohydrochloride had a melting point of 196°–197°C.

b. N-[1-(β-naphthyl)-propyl-(2)]-N'-(o-ethyl-phenyl)-piperazine hydrochloride 25 gm of the monohydrochloride end product obtained in (a) above were dissolved in 250 cc of methanol, 21.1 gm of dimethylaniline and a small amount of Raney nickel were added to the solution, and the mixture was hydrogenated at atmospheric pressure. After working up the reaction mixture in customary fashion, a good yield of N-[1-(β-naphthyl)-propyl-(2)]-N'-(o-ethyl-phenyl)-piperazine hydrochloride, m. p. 256°C., of the formula

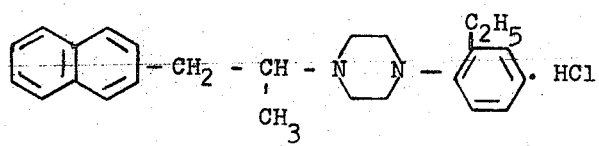

was obtained.

EXAMPLE 6

N-[1-(3',4'-methylenedioxy-phenyl)-propyl-(2)]-N'-(o-butoxy-phenyl)-piperazine monohydrochloride by method A 1-(3',4'-methylenedioxy-phenyl)-propanol-(2) was reacted with methanesulfochloride in pyridine, 0.05 mol of the resulting 1-(3',4'-methylenedioxy-phenyl)-propyl-(2)-methanesulfonate was admixed with 0.1 mol of N-(o-butoxyphenyl)-piperazine and 100 cc of toluene, and the mixture was refluxed until the reaction had gone to completion. The reaction mixture was worked up in customary manner, yielding N-[1-(3',4'-methylenedioxy-phenyl)-propyl-(2)]-N'-(o-butoxy-phenyl)-piperazine dihydrochloride, m.p. 213° – 216°C., which was stirred with water to yield the corresponding monohydrochloride, m. p. 227° – 228°C. (recrystallized from acetonitrile), of the formula

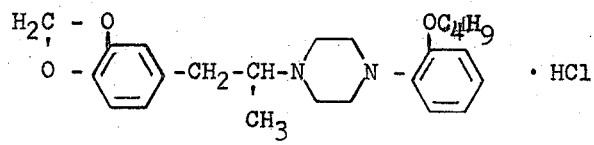

EXAMPLE 7

Using a procedure analogous to that described in Example 6, N-[1-(3',4'-methylenedioxy-phenyl)-propyl-(2)]-N'-(m-trifluoromethyl-phenyl)-piperazine dihydrochloride, m. p. 198° – 200°C., of the formula

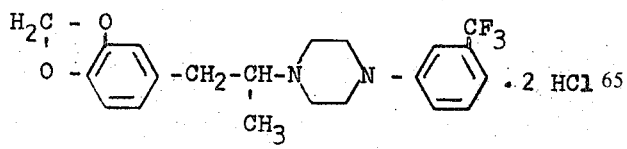

was prepared from 1-(3',4'-methylenedioxy-phenyl)-propyl-(2)-methanesulfonate and N-(m-trifluoromethyl-phenyl)-piperazine. The monohydrochloride had a melting point of 213°C.

EXAMPLE 8

N-[1-(1',4'-benzodioxanyl-6')-propyl-(2)]-N'-(o-ethyl-phenyl)-piperazine hydrochloride by method G A mixture of 7.5 gm of N-[1-(3',4'-dihydroxy-phenyl)-propyl-(2)]-N'-(o-ethyl-phenyl)-piperazine, m. p. 135° – 137°C. (m. p. of monohydrochloride 219°C.), 4.15 gm of ethylenebromide, 6.1 gm of potassium carbonate and 58 cc of dimethylformamide was refluxed for several hours. Thereafter, the reaction mixture was worked up in the usual manner, yielding N-[1-(1',4'-benzodioxanyl-6')-propyl-(2)]-N'-(o-ethyl-phenyl)-piperazine dihydrochloride, m. p. 277° – 278°C., which was stirred with water and yielded the corresponding monohydrochloride, m. p. 290°C. (recrystallized from acetonitrile), of the formula

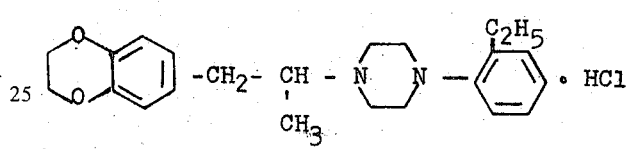

EXAMPLE 9

N-[1-(3',4'-methylenedioxy-phenyl)-propyl-(2)]-N'-(o-ethoxy-phenyl)-piperazine hydrochloride by Method C 1-(3',4'-methylenedioxy-phenyl)-isopropylamine was reacted with ethyleneoxide in a mixture of ethanol and water to form 1-(3',4'-methylenedioxy-phenyl)-2-[(bis-β-hydroxyethyl)-amino]-propane, b. p. 160° – 165°C. at 0.03 mm Hg, which was converted into its hydrochloride. The hydrochloride was then reacted with thionylchloride in acetonitrile to form 1-(3',4'-methylenedioxy-phenyl)-2-[(bis-β-chloroethyl)-amino]-propane, whose hydrochloride had a melting point of 177°C.

A mixture of 8.5 gm of the last-mentioned hydrochloride, 50 cc of cyclohexanol, 3 gm of o-ethylaniline and 10.3 gm of potassium carbonate was refluxed for four hours, accompanied by stirring. Thereafter, the inorganic salts which had precipitated were separated by vacuum filtration and washed with ethanol, and the cyclohexanol was distilled off, leaving as a residue N-[1-(3',4'-methylenedioxy-phenyl)-propyl-(2)]-N'-(o-ethoxy-phenyl)-piperazine, whose hydrochloride of the formula

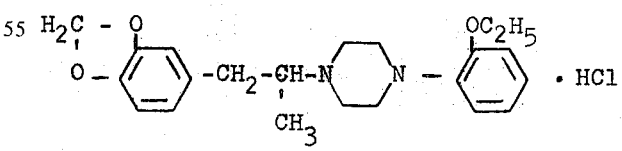

had a melting point of 277° – 278°C.

EXAMPLE 10

N-[1-(3',4'-methylenedioxy-phenyl)-propyl-(2)]-N'-(o-ethyl-phenyl)-piperazine by method C 12.3 gm of bis-β-chloroethyl-o-ethylphenyl-amine were admixed with 50 cc of ethanol, 9 gm of 1-(3',4'-methylenedioxy-phenyl)-isopropylamine and 13.8 gm of potassium carbonate, and the mixture was refluxed for 16 hours, while stirring. Thereafter, the reaction mixture was worked up as described in the preceding example, and the free base product was converted into its hydrochloride, yielding N-[1-(3',4'-methylenedioxy-phenyl)-isopropyl]-N'-(o-ethyl-phenyl)-piperazine hydrochloride, m. p. 277°C.

EXAMPLE 11

N-[1-(3',4'-methylenedioxy-phenyl)-propyl-(2)]-N'-(o-methyl-phenyl)-piperazine by method A Using a procedure analogous to that described in Example 6, N-[1-(3',4'-methylenedioxy-phenyl)-propyl-(2)]-N'—(o-methyl-phenyl)-piperazine monohydrochloride, m. p. 285°C. (recrystallized from ethanol), was prepared from 25.8 gm of 1-(3',4'-methylenedioxy-phenyl)-propanol-(2) methanesulfonic acid ester and 25.8 gm of N-(o-methylphenyl)-piperazine.

EXAMPLE 12

N-[1-(3',4'-methylenedioxy-phenyl)-propyl-(2)]-N'-(p-methyl-phenyl)-piperazine by method A Using a procedure analogous to that described in Example 6, N-[1-(3',4'-methylenedioxy-phenyl)-propyl-(2)]-N'-(p-methyl-phenyl)-piperazine, m. p. 92° – 93°C., was prepared from 25.8 gm of 1-(3',4'-methylenedioxy-phenyl)-propanol-(2)methanesulfonate and 25.8 gm of N-(p-methyl-phenyl)-piperazine. Its monohydrochloride had a melting point of 253°C. (recrystallized from ethanol).

EXAMPLE 13

N-[1-(3',4'-methylenedioxy-phenyl)-propyl-(2)]-N'-phenyl-piperazine monohydrochloride by method A Using a procedure analogous to that described in Example 6, N-[1-(3',4'-methylenedioxy-phenyl)-propyl-(2)]-N'-phenyl-piperazine and its monohydrochloride, m. p. 224°– 225°C. (recrystallized from acetonitrile), were prepared from 1-(3',4'-methylenedioxy-phenyl)-propanol-(2) methane-sulfonate and N-phenyl-piperazine.

EXAMPLE 14

N-[1-(3',4'-methylenedioxy-phenyl)-propyl-(2)]-N'-(p-acetyl-phenyl)-piperazine by method A Using a procedure analogous to that described in Example 6, N-[1-(3',4'-methylenedioxy-phenyl)-propyl-(2)]-N'-(p-acetyl-phenyl)-piperazine, m. p. 95°C., of the formula

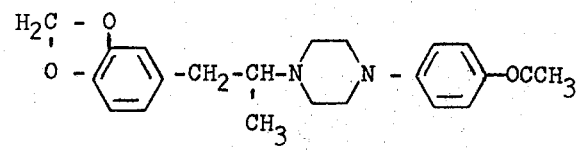

was prepared from 1-(3',4'-methylenedioxy-phenyl)-propanol-(2) methanesulfonate and N-(p-acetyl-phenyl)-piperazine. Its monohydrochloride had a melting point of 238°C. (recrystallized from ethanol).

EXAMPLE 15

N-[1-(3',4'-methylenedioxy-phenyl)-propyl-(2)]-N'-(o-ethyl-phenyl)-piperazine by method D 0.05 mol of N-[1-(3',4'-methylenedioxy-phenyl)-propyl-(2)]-N'-(o-ethyl-phenyl)-ethylenediamine [b. p. 207°C. at 0.0075 mm Hg; prepared by catalytic reduction of 1-(3,4-methylenedioxy-phenyl)-propanone-(2) and N-(o-ethyl-phenyl)-ethylenediamine] was admixed with 0.05 mol of ethylene bromide, 0.1 mol of potassium carbonate and 50 cc of cyclohexanol, and the mixture was refluxed first for 6 hours on an oil bath at 140°C. bath temperature and then for 8 hours at 180°C. external temperature. Thereafter, the inorganic salts which had precipitated out were collected by vacuum filtration and the cyclohexanol was distilled out of the filtrate. The residue was N-[1-(3',4'-methylenedioxy-phenyl)-propyl-(2)]-N'-(o-ethyl-phenyl)-piperazine, whose monohydrochloride had a melting point of 279°–280°C.

EXAMPLE 16

N-[1-(3',4'-methylenedioxy-phenyl)-propyl-(2)]-N'-(o-amino-phenyl)-piperazine and its dihydrochloride by method F 41 gm (0.101 mol) of N-[1-(3',4'-methylenedioxy-phenyl)-propyl-(2)]-N'-(o-nitro-phenyl)-piperazine monohydro-chloride [m.p. 232°–234°C, prepared analogous to Example 6 from 1-(3',4'-methylenedioxy-phenyl)-propanol-(2) methanesulfonate and N-(o-nitro-phenyl)-piperazine] were admixed with 820 cc of methanol, 4 gm of 10 percent palladized charcoal and 0.101 mol of aqueous hydrochloric acid, and the mixture was hydrogenated at a pressure of 5 atmospheres gauge and a temperature of 50°–60°C. After the calculated amount of hydrogen had been absorbed, the catalyst was removed by vacuum filtration, and the filtrate was evaporated, yielding N-[1-(3',4'-methylenedioxy-phenyl)-propyl-(2)]-N'-(o-amino-phenyl)-piperazine, whose dihydrochloride of the formula

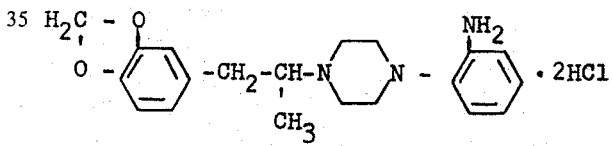

had a melting point of 302°C (decomposition).

EXAMPLE 17

8.3 gm of N-[1-(3',4'-methylenedioxy-phenyl)-propyl-(2)]-N'-(o-amino-phenyl)-piperazine, obtained pursuant to Example 16, were admixed with 83 cc of acetic acid anhydride, and the mixture was refluxed for 30 minutes. Thereafter, the excess unreacted acetic acid anhydride was distilled off, the residue was neutralized and dissolved in ethanol, and the solution was acidified with the calculated amount of ethereal hydrochloric acid. The precipitate formed thereby was collected and recrystallized from ethanol, yielding N-[1-(3',4'-methylenedioxy-phenyl)-propyl-(2)]-N'-(o-acetamido-phenyl)-piperazine monohydrochloride, m.p. 264°C, of the formula

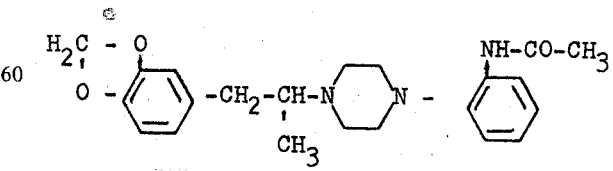

EXAMPLE 18

N-[1-(3',4'-methylenedioxy-phenyl)-propyl-(2)]-N'-(o-chloro-phenyl)-piperazine by method A Using a procedure analogous to that described in Example 6, N-[1-(3',4'-methylenedioxy-phenyl)-propyl-(2)]-N'-(o-chloro-phenyl)-piperazine monohydrochloride, m.p. 242°C (recrystallized from ethanol), was prepared from 25.8 gm of 1-(3',4'-methylenedioxy-phenyl)-propanol-(2) methane-sulfonic acid ester and 25.8 gm of N-(o-chlorophenyl)-piperazine.

The compounds embraced by formula I above and nontoxic, pharmacologically acceptable acid addition salts thereof have useful pharmacodynamic properties. More particularly, they exhibit central nervous system depressing activities, coupled with very low toxicity, in warm-blooded animals, such as mice, dogs and rabbits; thus, they are effective as sedatives, neuroleptics and tranquilizers. Particularly effective in this respect are compounds of the formula I wherein $R_1$ is hydrogen and $R_2$ is alkyl of 1 to 4 carbon atoms and specifically N-[1-(3',4'-methylenedioxy-phenyl)-propyl-(2)]-N'-(o-methyl-phenyl)-piperazine and its non-toxic acid addition salts, N-[1-(3',4'-methylenedioxy-phenyl)-propyl-(2)]N'-(p-methyl-phenyl)-piperazine and its non-toxic acid addition salts, N-[1-(3',4'-methylenedioxy-phenyl)-propyl-(2)]-N'-(o-ethyl-phenyl)-piperazine and its non-toxic acid addition salts, N-[1-(5'-indanyl)-propyl-(2)]-N'-(o-ethyl-phenyl)-piperazine and its non-toxic acid addition salts, and N-[1-(β-naphthyl)-propyl-(2)]-N'-(o-ethyl-phenyl)-piperazine and its non-toxic acid addition salts.

For pharmaceutical purposes, the compounds of the formula I are administered to warm-blooded animals perorally or parenterally as active ingredients in conventional dosage unit compositions, that is, compositions in dosage unit form consisting essentially of an inert pharmaceutical carrier and one dosage unit of the active ingredient, such as tablets, coated pills, wafers, capsules, solutions, suspensions, emulsions, syrups, suppositories and the like. One effective CNS-depressing dosage unit of the compounds of the formula I is from 0.25 to 3.4 mgm/kg body weight, preferably from 0.41 to 1.4 mgm/kg body weight. A dosage unit composition comprising a compound of the instant invention as an active ingredient may also contain one or more other active ingredients, such as other hypnotics, neuroleptics, spasmolytics, antiphlogistics and/or CNS depressants.

We have further discovered that a small group of these compounds, namely, the racemic or optically active compounds of the formula IA below

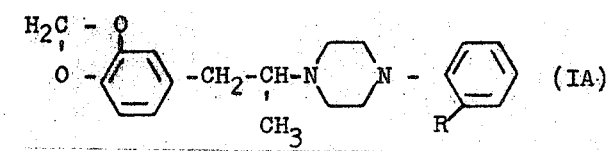

wherein R is hydrogen, methyl or ethyl, or a non-toxic pharmacologically acceptable acid addition salt thereof also exhibit an extremely strong antihypercholesteremic action in warm-blooded animals, and that they are superior to clofibrate due to the much smaller dose which has to be administered to the animal to achieve the desired results. For clofibrate a daily dose of 16.7 to 33.4 mgm/kg body weight is required, while for compounds embraced by formula IA, a daily dose of only 0.667 to 1.67 mgm/kg, preferably 1.0 to 1.42 mgm/kg body weight is required. Thus, as a single dose to be administered one to four times daily, a quantity of 0.167 to 1.67 mgm/kg is suitable.

In addition, the toxicity of the compounds of the formula IA is very low, so that they are extremely well suited for pharmaceutical use.

The antihypercholesteremic action of the compounds embraced by formula IA was ascertained in a test lasting 18 days on 80 male rats of the FW 49-strain. The compound under investigation was administered perorally, once daily by means of a stomach tube, in emulsion form together with the solubilizer Tween 80. The controls received only physiological common salt solution together with Tween 80.

The serum cholesterol level was determined according to the methods of Levine, as well as J. and B. Zak in Clin. Chem. Acta 10, pages 381–384 (1964). The determination of triglycerides in the serum was carried out by fluorimetry in the auto-analyzer according to R. P. Noble and F. M. Campbell, Clin. Chem. Acta 16, pages 166–170 (1970).

The results are shown in the following table:

| Comparative Tests to Determine the Total Cholesterol in the Serum of Rats | | | | | | |
|---|---|---|---|---|---|---|
| | Before Test | | 8th Day of Test | | 18th Day of Test | |
| | $\overline{x}$ | % | $\overline{x}$ | % | $\overline{x}$ | % |
| Control | 100.7 | 100 | 84.7 | −16 | 96.6 | − 4 |
| Clofibrate | | | | | | |
| 90 mg/kg | 87.1 | 100 | 69.8 | −20 | 83.3 | − 4 |
| 540 mg/kg | 91.1 | 100 | 39.7 | −57 | 69.1 | −24 |
| N-[1-(3',4'-methylenedioxy-phenyl)-propyl(2)]-N'-(o-methylphenyl)-piperazine | | | | | | |
| 15 mg/kg | 90.4 | 100 | 80.7 | −11 | 96.2 | + 6 |
| 90 mg/kg | 77.8 | 100 | 44.5 | −43 | 39.4 | −49 |
| N-[1-(3',4'-methylenedioxy-phenyl)-propyl(2)]-N'-phenylpiperazine | | | | | | |
| 15 mg/kg | 84.1 | 100 | 50.9 | −40 | 76.2 | − 9 |
| 90 mg/kg | 103.3 | 100 | 31.6 | −69 | 45.5 | −56 |

As may be seen from the above table, the doses chosen for N-[1-(3',4'-methylenedioxyphenyl)-propyl(2)]-N'-(o-methylphenyl)-piperazine were six times lower than the doses of clofibrate. In comparison to the untreated controls, on the eighth day of examination, with the lowest dosage-units of the substances under examination, a clearly antihypercholesteremic action could only be proved with N-[1-(3',4'- methylenedioxyphenyl)-propyl-(2)]-N'-phenyl-piperazine. On the 18th day of examination, there was still a tendency for antihypercholesteremic activity with this dose and the same substance. With the high dose, on the eighth day of examination, in comparison to the untreated controls, all three substances effected a strong antihypercholesteremic activity; where N-[1-(3',4'-methylenedioxy-phenyl)-propyl(2)]-N'phenyl-piperazine proved to be the most effective substance. When the comparison was finished, the antihypercholesteremic activity of clofibrate of 24 percent was weaker than that of N-[1-(3',4'-methylenedioxyphenyl)-propyl-(2)]-N'-(o-methylphenyl)-piperazine (49 percent) and N-[1-(3',4'-methylenedioxyphenyl)-propyl(2)]-N'-phenyl-piperazine (56 percent).

The triglycerides, determined at the end of the examination in all the animals, showed with the substances N-[1-(3',4'-methylenedioxyphenyl)-propyl(2)]-N'-(o-methyl-phenyl)-piperazine and N-[1-(3',4'-methylenedioxyphenyl)-propyl-(2)]-N'-phenyl-piperazine in the high-dose group a decrease in percentage of these natural fats in the blood serum from 37 to 33 percent. For clofibrate, a decrease in the triglyceride values could not be proved.

For prophylactic treatment of coronary thrombosis the active ingredients of the formula IA may also be combined with coronary dilators, such as for example, dipyridamol (2,6-bis-(diethanolamino)-4,8-dipiperidino-pyrimido-[5,4-d]-pyrimidine), where a daily dose of 0.833 to 2.5 mgm/kg body weight (single dose of 0.167 to 2.5 mgm/kg body weight) of the coronary dilators may be employed.

The following examples illustrate a few pharmaceutical dosage unit compositions comprising a compound of the formula I as an active ingredient and represent the best mode contemplated of putting the present invention into practical use. The parts are parts by weight unless otherwise specified.

EXAMPLE 19

Tablets

The tablet composition was compounded from the following ingredients:

| | |
|---|---|
| N-[1-(3',4'-methylenedioxy-phenyl)-propyl-(2)]-N'-(o-methyl-phenyl)-piperazine | 30 parts |
| Lactose | 70 parts |
| Corn starch | 93 parts |
| Secondary calcium phosphate | 47 parts |
| Soluble starch | 3 parts |
| Magnesium stearate | 3 parts |
| Colloidal silicic acid | 4 parts |
| Total | 250 parts |

Compounding procedure:

The piperazine compound was intimately admixed with about one-half of each of the inert components except the soluble starch, the mixture was moistened with an aqueous solution of the soluble starch, and the moist mass was forced through a 1.5 mm-mesh screen. The moist granulate thus obtained was dried and admixed with the remainder of the inert components, and the mixture was pressed into 250 mgm-tablets. Each tablet contained 30 mgm of the piperazine compound and is an oral dosage unit composition with effective central nervous system depressing effects and with effective antihypercholesteremic action.

EXAMPLE 20

Coated Pills

The pill cores were compounded from the following ingredients:

| | |
|---|---|
| N-[1-(5'-indanyl)-propyl-(2)]-N'-(o-ethyl-phenyl)-piperazine | 40 parts |
| Corn starch | 80 parts |
| Lactose | 50 parts |
| Secondary calcium phosphate | 50 parts |
| Magnesium stearate | 3 parts |
| Soluble starch | 3 parts |
| Colloidal silicic acid | 4 parts |
| Total | 230 parts |

Compounding procedure:

The ingredients were admixed and the mixture granulated in the same manner as in Example 19, and the final composition was pressed into 230 mgm-pill cores, which were then coated in conventional manner with a mixture consisting essentially of talcum, sugar and gum arabic. Each coated pill contained 40 mgm of the piperazine compound and is an oral dosage unit composition with effective central nervous system depressing activity.

EXAMPLE 21

Tablets with additional spasmolytic ingredient:

The tablet composition was compounded from the following ingredients:

| | |
|---|---|
| N-[1-(3',4'-methylenedioxy-phenyl)-propyl-(2)]-N'-(o-ethyl-phenyl)-piperazine | 35 parts |
| (−)-N-scopolammonium-butylbromide | 25 parts |
| Lactose | 164 parts |
| Corn starch | 194 parts |
| Colloidal silicic acid | 14 parts |
| Polyvinylpyrrolidone | 6 parts |
| Magnesium stearate | 2 parts |
| Soluble starch | 10 parts |
| Total | 450 parts |

Compounding procedure:

The piperazine compound and the scopolammonium compound were intimately admixed with about one-half of the required amounts of the inert carrier components except the soluble starch, the mixture was moistened with an aqueous solution of the soluble starch, and the moist mass with granulated by passing it through a 1.5 mm-mesh screen. The moist granulate was dried and then admixed with the remainder of the inert components, and the finished composition was pressed into 450 mgm-tablets. Each tablet contained 35 mgm of the piperazine compound and 25 mgm of scopolammonium compound and is an oral dosage unit composition with effective CNS-depressing and spasmolytic activity and with effective antihypercholesteremic activity.

EXAMPLE 22

Suppositories

The suppository composition was compounded from the following ingredients:

| | |
|---|---|
| N-[1-(3',4'-methylenedioxy-phenyl)-propyl-(2)]-N'-(p-acetyl-phenyl)-piperazine | 30 parts |
| Dipyrone | 10 parts |
| Lecithin | 2 parts |
| Cocoa butter | 1790 parts |
| Total | 1832 parts |

Compounding procedure:

The cocoa butter was melted, and a mixture of the piperazine compound, the dipyrone and the lecithin was homogeneously distributed in the melted cocoa butter. The homogeneous composition was then poured into cooled suppository molds, each holding 1832 mgm of the composition. Each suppository contained 30 mgm of the piperazine compound and 10 mgm of dipyrone and was a rectal dosage unit composition with effective CNS-depressing, analgesic, antipyretic and antirheumatic activities.

EXAMPLE 23

Tablets

The tablet composition is compounded from the following ingredients:

| | |
|---|---|
| N-[1-(3',4'-methylenedioxyphenyl)-propyl(2)]-N'-(o-ethylphenyl)-Piperazine · HCl | 50 parts |
| Lactose | 50 parts |
| Corn starch | 93 parts |
| Sec. calcium phosphate | 47 parts |
| Soluble starch | 3 parts |
| Magnesium stearate | 3 parts |
| Colloidal silicic acid | 4 parts |
| Total | 250 parts |

Preparation:

The piperazine compound is admixed with part of the pharmaceutical carriers, thoroughly kneaded with an aqueous solution of the starch and then granulated through a screen in a conventional manner. The resulting granulate is admixed with the remainder of the pharmaceutical carriers and compressed into tablets, such having a weight of 250 mgm. Each tablet contains 50 mgm of the piperazine compound and in an oral dosage unit composition with effective antihypercholesteremic activity and with effective central nervous system depressing activity.

EXAMPLE 24

Coated Tablets - Combination with coronary dilator

The tablet core composition is compounded from the following ingredients:

| | |
|---|---|
| N-[1-(3',4'-methylenedioxyphenyl)-propyl(2)]-N'-(o-methylphenyl)-piperazine | 40 parts |
| 2,6-Bis-(diethanolamino)-4,8-dipiperidino-pyrimido[5,4-d] pyrimidine | 70 parts |
| Corn starch | 60 parts |
| Sec. calcium phosphate | 50 parts |
| Magnesium stearate | 3 parts |
| Soluble starch | 3 parts |
| Colloidal silicic acid | 4 parts |
| | 230 parts |

Preparation:

The active ingredients are admixed with part of the pharmaceutical carriers, kneaded with an aqueous solution of the soluble starch and then granulated in a conventional manner. the granulate is admixed with the remaining pharmaceutical carriers and compressed into tablet cores, each weighing 230 mgm. The cores are then coated in conventional manner with a mixture of talcum, sugar and gum arabic. Each coated tablet contains 40 mgm of the piperazine compound and 70 mgm of the pyrimidopyrimidine compound and is an oral dosage unit composition with effective antihypercholesteremic and coronary dilating activities and with effective central nervous system depressing activity.

EXAMPLE 25

Gelatin Capsules

The capsule contents are compounded from the following ingredients:

| | |
|---|---|
| N-[1-(3',4'-methylenedioxyphenyl)-propyl(2)]-N'-phenylpiperazine | 60 parts |
| Inert, solid diluent such as starch, lactose or kaolin | 240 parts |
| Total | 300 parts |

Preparation:

The ingredients are homogeneously mixed and 300 mgm-portions are filled into No. 1 gelatin capsules. Each gelatin capsule contains 60 mgm of the piperazine compound and is an oral dosage unit composition with effective antihypercholesteremic activity and with effective central nervous system depressing activity.

Analogous results with respect to central nervous system depressing activity are obtained when any one of the other N,N'-disubstituted piperazines embraced by formula I, or a non-toxice, pharmacologically acceptable acid addition salt thereof is substituted for the particular N,N'-disubstituted piperazine in Examples 19 to 25.

Analogous results with respect to the combination of central nervous system depressing activity and antihypercholesteremic activity are obtained when any one of the other N,N'-disubstituted piperazines embraced by formula IA, or a non-toxic, pharmacologically acceptable acid addition salt thereof is substituted for the particular N,N'-disubstituted piperazine in Examples 19, 21 and 23 to 25.

Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A pharmaceutical dosage unit composition consisting essentially of an inert pharmaceutical carrier and an effective CNS-depressing amount or an effective antihypercholesteremic amount of a racemic or optically active compound of the formula

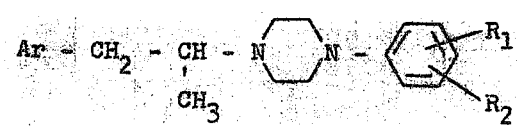

wherein Ar is 3,4-methylenedioxy-phenyl, indanyl, naphthyl or 1,4-benzodioxanyl, and $R_1$ and $R_2$ are each hydrogen, halogen, amino, acetylamino, trifluoromethyl, alkyl of 1 to 4 carbon atoms, alkoxy of 1 to 4 carbon atoms, alkylcarbonyl of 1 to 4 carbon atoms or alkylthio of 1 to 4 carbon atoms, or a non-toxic, pharmacologically acceptable acid addition salt thereof.

2. A composition of claim 1, wherein said compound is racemic or optically active N-[1-(3',4'-methylene-dioxy-phenyl)-propyl-(2)]-N'-(o,o'-dimethyl-phenyl)-piper-azine or a non-toxic, pharmacologically acceptable acid addition salt thereof.

3. A composition of claim 1, wherein said compound is racemic or optically active N-[1-(3',4'-methylene-dioxy-phenyl)-propyl-(2)]-N'-(o-methoxy-phenyl)-piperazine or a non-toxic, pharmacologically acceptable acid addition salt thereof.

4. A composition of claim 1, wherein said compound is racemic or optically active N-[1-(5'-indanyl)-propyl-(2)]-N'-(o-ethyl-phenyl)-piperazine or a non-toxic, pharmacologically acceptable acid addition salt thereof.

5. A composition of claim 1, wherein said compound is racemic or optically active N-[1-(β-naphthyl)-propyl-(2)]-N'-(o-ethyl-phenyl)-piperazine or a non-toxic, pharmacologically acceptable acid addition salt thereof.

6. A composition of claim 1, wherein said compound is racemic or optically active N-[1-(3',4'-methylene-dioxy-phenyl)-propyl-(2)]-N'-(o-butoxy-phenyl)-piperazine or a non-toxic, pharmacologically acceptable acid addition salt thereof.

7. A composition of claim 1, wherein said compound is racemic or optically active N-[1-(3',4'-methylene-dioxy-phenyl)-propyl-(2)]-N'-(m-trifluoromethyl-phenyl)-piperazine or a non-toxic, pharmacologically acceptable acid addition salt thereof.

8. A composition of claim 1, wherein said compound is racemic or optically active N-[1-(1',4'-benzodioxanyl-6')-propyl-(2)]-N'-(o-ethyl-phenyl)-piperazine or a non-toxic, pharmacologically acceptable acid addition salt thereof.

9. A composition of claim 1, wherein said compound is racemic or optically active N-[1-(3',4'-methylene-dioxy-phenyl)-propyl-(2)]-N'-(p-methyl-phenyl)-piperazine or a non-toxic, pharmacologically acceptable acid addition salt thereof.

10. A composition of claim 1, wherein said compound is racemic or optically active N-[1-(3',4'-methylene-dioxy-phenyl)-propyl-(2)]-N'-(p-acetyl-phenyl)-piperazine or a non-toxic, pharmacologically acceptable acid addition salt thereof.

11. A composition of claim 1, wherein said compound is racemic or optically active N-[1-(3',4'-methylene-dioxy-phenyl)-propyl-(2)]-N'-(o-amino-phenyl)-piperazine or a non-toxic, pharmacologically acceptable acid addition salt thereof.

12. A composition of claim 1, wherein said compound is racemic or optically active N-[1-(3',4'-methylene-dioxy-phenyl)-propyl-(2)]-N'-(o-acetamido-phenyl)-piperazine or a non-toxic, pharmacologically acceptable acid addition salt thereof.

13. A composition of claim 1, wherein said compound is racemic or optically active N-[1-(3',4'-methylene-dioxy-phenyl)-propyl-(2)]-N'-(o-chloro-phenyl)-piperazine or a non-toxic, pharmacologically acceptable acid addition salt thereof.

14. A composition of claim 1, wherein said compound is a racemic or optically active compound of the formula

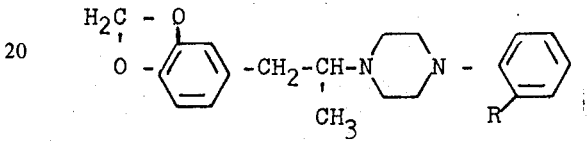

wherein R is hydrogen, methyl or ethyl, or a non-toxic pharmacologically acceptable acid addition salt thereof.

15. A composition of claim 14, wherein said compound is racemic or optically active N-[1-(3',4'-methylene-dioxy-phenyl)-propyl-(2)]-N'-(o-ethyl-phenyl)-piperazine or a non-toxic, pharmacologically acceptable acid addition salt thereof.

16. A composition of claim 14, wherein said compound is racemic or optically active N-[1-(3',4'-methylene-dioxy-phenyl)-propyl-(2)]-N'-(o-methyl-phenyl)-piperazine or a non-toxic, pharmacologically acceptable acid addition salt thereof.

17. A composition of claim 14, wherein said compound is racemic or optically active N-[1-(3',4'-methylene-dioxy-phenyl)-propyl-(2)]-N'-phenyl-piperazine or a non-toxic pharmacologically acceptable acid addition salt thereof.

18. A pharmaceutical dosage unit composition according to claim 14 comprising in addition from 0.167 to 2.5 mgm/kg of a coronary dilator.

* * * * *